United States Patent [19]

Zima et al.

[11] Patent Number: 4,849,475

[45] Date of Patent: Jul. 18, 1989

[54] WATER-DILUTABLE BINDERS BASED ON ACRYLATES FOR USE IN CATHODICALLY DEPOSITABLE PAINTS

[75] Inventors: Herbert Zima, Graz; Josef Forstner, Wildon, both of Austria

[73] Assignee: Vianova Kunstharz, A.G., Werndorf, Austria

[21] Appl. No.: 121,281

[22] Filed: Nov. 16, 1987

[30] Foreign Application Priority Data

Nov. 14, 1986 [AT] Austria ................................. 3028/86

[51] Int. Cl.$^4$ ............................................. C08L 61/00
[52] U.S. Cl. ................................... 525/154; 204/181.7; 524/512; 524/539; 524/901; 525/172; 525/176
[58] Field of Search .................. 524/512, 901, 539; 525/154, 327.3, 172, 176; 204/181.7

[56] References Cited

U.S. PATENT DOCUMENTS 4,458,054 7/1984 Schmözer et al. ................ 525/327.3
4,523,007 6/1985 Schipfer et al. ....................... 528/227

Primary Examiner—Theodore E. Pertilla
Attorney, Agent, or Firm—A. W. Breiner

[57] ABSTRACT

Water-dilutable paint binders based on acrylates for cathodically depositable paints particularly suited for the formulation of decorative single coats or pale primers are described. The binders are partial condensation products of from 60% to 90% by weight of a hydroxy and amino group containing acrylic copolymer, the basic groups of which were obtained through reaction of glycidyl groups with secondary amines, with 10% to 40% by weight of an oliogomeric or polymeric compound carrying CH-active ester groups, preferably malonic acid ester groups, capable of transesterification or transamidation. The paint films afford particularly good yellowing resistance, detergent resistance, and abrasion resistance.

22 Claims, No Drawings

4,849,475

WATER-DILUTABLE BINDERS BASED ON ACRYLATES FOR USE IN CATHODICALLY DEPOSITABLE PAINTS

FIELD OF INVENTION

The invention is directed to water-dilutable paint binders and to a process for producing the binders. More particularly, the invention is directed to binders based on acrylates for cathodically depositable paints, particularly suited for the formulation of decorative single coat paints or pale primers. The binders, upon protonation, are water-dilutable, partial condensation products of hydroxy and amino group containing acrylic copolymers with an oligomeric or polymeric compound carrying CH-active ester groups, preferably malonic acid ester groups capable of transesterification or transamidation.

BACKGROUND OF INVENTION

Binders suitable for the formulations of cathodically depositable decorative single coat paints are described, for example, in DE-OS No. 23 25 177. In that document acrylic copolymers carrying glycidyl groups are reacted with 0.1 to 1.0 equivalents of a secondary amine per glycidyl group equivalent. The binders obtained crosslink essentially via the unreacted glycidyl groups. These groups, however, are not stable in an aqueous solution for any prolonged period of time, which causes a reduction in the curing characteristics of the binder in the course of time and renders the paint useless.

EP No. -A1-01 31 125 discloses the use of crosslinking components based on beta-hydroxyalkylester group containing compounds to crosslink amine adducts of glycidyl group containing copolymers.

AT-PS No. 372,099, corresponding to U.S. Pat. No. 4,458,054, discloses the use of malonic acid esters as crosslinking agents for cationic binders. This document also refers to the possibility of using the malonic acid esters with copolymers containing cationic groups.

AT-PS No. 379,602, corresponding to U.S. Pat. No. 4,523,007, also describes crosslinking agents based on malonic acid esters which react by transesterification and transamidation. According to the disclosure, CH-acidic compounds carrying at least one ester group are reacted with a carbonyl compound in a KNOEVENAGEL-type reaction, and the resulting alpha-disubstituted alkylidene compound is polymerized to an oligomeric compound with a molecular weight of from about 300 to 6000. Optionally, the crosslinking agent can be partially pre-condensed with a basic resin used in the binder system.

According to the known disclosures, the crosslinking agents are only mixed with the polymers. It has been found, however, that when using acrylic copolymers as the base resin, probably due to severe incompatibility, resin blends and pigment pastes separate into two phases after only short storage times. Satisfactory re-dispersion is largely uneconomical. A further disadvantage results from surface defects in the films which cannot be remedied in most cases.

It has now been found that binders for paint systems based on acrylates which crosslink through transesterification or transamidation and are suitable for cathodically depositable paints to provide excellent performance, can be obtained through the judicious selection of the binder components.

GENERAL DESCRIPTION OF INVENTION

The present invention is thus directed to a process for producing cathodically depositable paints based on acrylic copolymers, water-dilutable upon protonation, which crosslink through transesterification or transamidation, characterized in that —

Component (A) 60% to 90% by weight, preferably 75% to 85% by weight, of an epoxy group free amine adduct of an acrylic copolymer carrying glycidyl groups and optionally primary hydroxy groups, wherein the quantity of the secondary amine used in the adduct is chosen in order that the ratio between the original glycidyl groups of the acrylic copolymer and the secondary amino groups ranges between 1:0.7 and 1:1, and the final adduct-product has an amine value of 35 to 140 mg KOH/g, preferably 80 to 110 mg KOH/g, which will ensure water-dilutability upon protonation, and a hydroxyl value of about 100 to 250 mg KOH/g, preferably 130 to 180 mg KOH/g, and preferably based totally or partially on primary hydroxy groups, is partially condensed at 100° to 120° C. with Component (B) 10% to 40% by weight, preferably 15% to 25% by weight, of an oligomeric or polymeric compound carrying CH-active ester groups, preferably malonic acid ester groups and capable of transesterification and/or transamidation, to an intrinsic viscosity of 8 to 18 ml/g, preferably 9 to 15 ml/g, measured in $CHCl_3$ at 20° C., under the condition whereby the ratio between the intrinsic viscosity of the starting mixture and of the partial condensation product, measured in $CHCl_3$ at 20° C., lies between 1:1 and 1:1.5, preferably 1:1.01 and 1:1.25, and the limit for solubility of the protonated condensation product is not surpassed.

The invention is further concerned with the binders prepared according to the process of the invention and with the use of the binders in cathodically depositable paints for decorative pigmented or unpigmented single coat paints or pale primers on metal substrates.

The cathodically depositable paints prepared from the binders of the present invention are particularly suited for decorative single coat paints of the type used in the industrial coating of household appliances, lamps, radiators, and similar objects where high resistances to yellowing of the white or pale coatings is required. Because of their good resistance to detergents, they can also be used for coating washing machines and refrigerators. With adequate pigmentation, they are suitable also for coating automobile fittings such as wheel rims, windshield wipers, etc., and for coating parts for farm implements. The binders are also suitable for the formulation of pale primers. As clear varnished, the materials can be used to coat galvanized substrates to improve their optical aspect as well as resistance characteristics. Clear varnishes can also be used to prevent metal abrasion on jewelry, metal fittings, and fixtures. For special effects, the varnishes can be pigmented with non-hiding pigments, i.e., transparent paints.

The acrylate polymers carrying glycidyl groups useful in the present invention are prepared in known manner, for example, by solution polymerization. The useful monomers are glycidyl(meth)acrylate and, optionally, hydroxyalkyl(meth)acrylates and alkyl(meth)acrylates containing from 1 to 13 carbon atoms in the alkyl radical. Aromatic vinyl compounds, styrol in particular, can be coemployed with the acrylates. The solvents used in the polymerization are glycol ethers, such as ethoxy- or butoxyethanol, and methoxypropanol. Methoxypropanol is the preferred solvent.

The glycidyl groups of the acrylate copolymer are reacted at 90° to 95° C. with secondary amines to form Component (A). The preferred amines are the dialkanolamines, such as diethanolamine or dipropanolamine, to introduce primary hydroxy groups into the polymer which are advantageous for crosslinking. Primary amine groups for crosslinking through transamidation may be introduced through primary-secondary polyamines, the primary amino groups thereof being blocked as ketimines. One preferred compound is the reaction product of diethylenetriamine with two moles of a ketone.

The amine component of the adduct of Component (A) is used in a quantity in order that the molar ratio between the glycidyl groups of the copolymer and the secondary amino groups lies in a range of from 1:0.7 to 1:1. It has been established that despite the fact that the reacting groups are not in an equivalent ratio, the products obtained have no free glycidyl groups. If the molar ratio deviates more than about ten percent from the above range, defects will occur which are normally associated with free glycidyl groups such as unsatisfactory stability and defects normally associated with free amine salts in the bath material, such as film defects in the deposited film. A further criterion for determining the quantity of the amine component is to obtain solubility in water upon protonation of the binders. For example, a 15% aqueous solution of the binder must not show any separation after at least twenty-four hours. Thus, the quantity of amine is chosen in order that the final product has an amine value of from about 35 to 140 mg KOH/g. The preferred range for the amine value is from about 80 to 110 mg KOH/g.

In order to ensure appropriate crosslinking through transesterification or transamidation with the ester groups of the crosslinking component, the copolymers must have a hydroxyl value of from about 100 to 250 mg KOH/g, preferably 130 to 180 mg KOH/g which preferably stems from primary hydroxy groups. Optionally, the hydroxy groups may be totally or partially replaced by the equivalent quantity of primary amino groups.

The crosslinking component is an oligomer or polymer carrying CH-active ester groups, preferably malonic acid ester groups. The preparation of products of this type is described in AT-PA No. 372,099, corresponding to U.S. Pat. No. 4,458,054; and AT-PS No. 379,602, corresponding to U.S. Pat. No. 4,523,077. The preferred malonic acid ester derivatives are described in Austrian Application No. A 1235/86, laid open to public inspection Apr. 15, 1987; corresponding to U.S. Ser. No. 07/048,588 filed May 11, 1987. These esters are KNOEVENAGEL-reaction produces of CH-active esters and a carbonyl compound, and are reacted through partial transesterification with diols or polyols. The particularly preferred crosslinking components are prepared from diethylmalonate, formaldehyde, and 30 to 40 mole-% of propyleneglycol-1,3.

In a modification of the present invention, the copolymer-amine adducts can be obtained by prior reaction of glycidyl(meth)acrylate with the amine and subsequent copolymerization. In the reaction with the amine it is advantageous to add a suitable polymerization inhibitor, such as a hydroquinone, to the glycidyl monomer to prevent a polymerization reaction. The further polymerization is carried out in known manner in the presence of solvents and free-radical initiators.

The polymer component of the invention is partially condensed at 100° to 120° C. with the crosslinking component. In this reaction care should be taken that the limit of the solubility of the protonated condensation product in water is not surpassed. Normally, the condensation is finished after about two to six hours. The criterion for determining the desired degree of condensation is the rise of the intrinsic viscosity, measured in $CHCl_3$ at 20° C. In order to obtain the desired properties, the intrinsic viscosity of the condensation product should rise to a final value of 8 to 18 ml/g; the preferred range being from 9 to 15 ml/g. The ratio of the intrinsic viscosities of the starting blend and the condensation product, measured in $CHCl_3$ at 20° C., must be between about 1:1 and 1:1.5, preferably 1:1.01 and 1:1.25. The components are used in a ratio of from 60% to 90% by weight of the polymer and from 10% to 40% by weight of the crosslinking component. The preferred range is from 75% to 85% by weight of the polymer, and from 15% to 25% by weight of the crosslinking component.

The binders are transferred in known manner to the water-dilutable salt form through partial or total neutralization with organic and/or inorganic acids, preferably formic aid, acetic acid, or lactic acid.

Paint can be prepared using the binders of this invention in known procedures. Further, application by the electrode position process is known to one skilled in the art. An advantageous method is described in the following examples.

PRESENTLY PREFERRED EMBODIMENTS

The following examples illustrate the invention without limiting its scope. Parts and percentages are by weight unless otherwise stated.

(A) Preparation Of The Copolymer-Amine Adducts
(Component A)

Component A-1:

In a reaction vessel equipped with reflux condensor, addition vessel, thermometer, inert gas duct, heating and cooling (if necessary) and agitator, 40 parts methoxypropanol and 2 parts 2,2'-azobisisobutyronitrile are charged under inert gas protection and heated to 85° C. A blend of 40 parts glycidylmethacrylate, 20 parts methylmethacrylate, 40 parts 2-ethylhexylacrylate and 2 parts 2,2'-azobisisobutyronitrile (ABN) are added within two hours from the addition vessel and reacted for a further three hours at 85° C. Thereafter, a solution of 28 parts diisopropanolamine in 36 parts methoxypropanol is added, and the batch is held for four hours at 90° to 95° C. A 62% resin solution is obtained.

Characteristics Of The Product:
Ratio Glycidyl Groups/Amino Groups: 1:0.75
Hydroxyl Value (Total/Primary OH): 275/185 mg KOH/g
Amine Value: 92 mg KOH/g Component A-2:

A resin is prepared in the same way as Component A-1 except that the methylmethacrylate is replaced with the same quantity of styrol.

Characteristics Of The Product:
Ratio Glycidyl Groups/Amino Groups: 1:0.75
Hydroxyl Value (Total/Primary OH): 275/185 mg KOH/g
Amine Value: 92 m KOH/g Component A-3:

With the equipment described under Component A-1, 40 parts methoxypropanol and 2 parts ABN are heated to 85° C under an inert gas. Within two hours a blend of 30 parts glycidlymethacrylate, 24 parts methylmethacrylate, 46 parts 2-ethylhexylacrylate, and 2 parts ABN are continuously added and held for three additional hours at 85° C. The temperature is then raised to 90° to 95° C., and a solution of 28 parts diisopropanolamine in 36 parts methoxypropanol is added and reacted for four hours at 95° C.

Characteristics Of The Product:
Ratio Glycidyl Groups/Amino Groups: 1:1
Hydroxyl Value (Total/Primary OH): 214/143 mg KOH/g
Amine Value: 92 mg KOH/g Component A-4:
With the equipment described under Component A-1, 11 parts diisopropanolamine and 6 parts methoxypropanol are heated to 50° C., and, within four hours, 13 parts glycidylmethacrylate, stabilized with 125 ppm hydroquinone are added. The temperature is held for two additional hours to complete the reaction. In a second apparatus, 48 parts methoxypropanol and 2 parts ABN are heated to 85° C. under inert gas and, within two hours, a blend of 30 parts of the above intermediate product with 11 parts 2-hydroxypropylmethacrylate, 20 parts methylmethacrylate, 40 parts 2-ethylhexylacrylate, and 2 parts ABN is continuously added. At the end of the addition, the temperature is held for another six hours at 85° C., whereby after about three hours 0.3 parts ABN are added. A 63% resin solution is obtained.

Characteristics Of The Product:
Ratio Glycidyl Groups/Amino Groups: 1:0.9
Hydroxyl Value (Total/Primary OH): 245/115 mg KOH/g
Amine Value: 49 mg KOH/g

(B) Preparation Of The Crosslinking Components (Component B)

Component B-1:
The raw materials for the crosslinking component are listed in Table 1. The crosslinking components are prepared in the following manner:

In a suitable reaction vessel equipped for azeotropic distillation and a bubble tray for the separation of the alcohol component forming during partial transesterification, formaldehyde, as paraformaldehyde, is added in portions to a blend of the ester component and the catalyst blend, each 0.5 to 1.0 mole-%, calculated on ester, of piperidine and formic acid, at a temperature of 70° to 80° C., with the temperature being controlled so that it does not rise due to the exothermic reaction beyond a maximum of 90° C. The temperature is held until the paraformaldehyde has dissolved completely. The temperature is then slowly raised to 110° to 120° C., and the reaction water which is formed is entrained from the reaction mass with the aid of a suitable entraining agent. After vacuum-stripping the entraining agent, the polyol component is added and the temperature is raised to about 140° to 180° C. until distillation starts. The obtained reaction products have a resin solids content of between 90% and 96%.

Table 1 is as follows:

TABLE 1

|  | B 1 | B 2 | B 3 | B 4 | B 5 |
| --- | --- | --- | --- | --- | --- |
| Moles Diester | 1 MDE | 1 MDE | 1 MDE | 1 MDE | 1 MDE |
| Moles $CH_2O$ | 0.5 | 0.5 | 0.5 | 0.5 | 0.5 |
| Moles Polyol | 0.3 PG | 0.4 NPG | 0.4 D | 0.4 BD | 0.4 HD |
| Ester Equivalents | 97 | 84 | 98 | 81 | 87 |
| OH—Value mg KOH/g | 5 | 5 | 5 | 13 | 9 |
| Intrinsic Viscosity DMF/20° C. | 3.5 | 3.5 | 8.0 | 6.8 | 6.6 |
| Refractive Index n 20/D | 1.4600 | 1.4515 | 1.4990 | 1.4629 | 1.4623 |

MDE malonic acid diethylester
PG propyleneglycol-1,2
NPG neopentylglycol
D 1,1'-isopropylidene-bis-(p-phenyloxy)-diethanol-2
BD butanediol-1,4
HD hexanediol-1,6

Examples C-1 to C-8

To obtain the partial condensation products, Components (A) and (B) are reacted in the ratios and under the conditions listed in Table 2 which also lists the characteristics of the reaction products. Table 2 is a follows:

TABLE 2

| Examples | C-1 | C-2 | C-3 | C-4 | C-5 | C-6 | C-7 | C-8 |
| --- | --- | --- | --- | --- | --- | --- | --- | --- |
| Component (A) | A-3 | A-4 | A-1 | A-1 | A-1 | A-1 | A-1 | A-2 |
| Component (B) | B-1 | B-1 | B-1 | B-2 | B-3 | B-4 | B-5 | B-4 |
| Weight Ratio (A):(B) (Resin Solids) | 80:20 | 80:20 | 85:15 | 65:35 | 70:30 | 80:20 | 85:15 | 80:20 |
| Reaction Time at 110° C. (hours) | 4 | 4 | 10 | 2 | 4 | 4 | 4 | 4 |
| Intrinsic Viscosity $CHCl_3$/20° C. |  |  |  |  |  |  |  |  |
| (a) before condensation | 11.3 | 10.2 | 12 | 9.1 | 12 | 12.2 | 12.2 | 10.8 |
| (b) after condensation | 12.4 | 10.4 | 15 | 10.6 | 13.2 | 14.6 | 13.4 | 13.2 |
| Ratio (a):(b) | 1:1.1 | 1:1.02 | 1:1.25 | 1:1.16 | 1:1.1 | 1:1.2 | 1:1.1 | 1:1.22 |
| Solids Content % | 66 | 66 | 67 | 73 | 70 | 68 | 66 | 68 |

TABLE 2-continued

| Examples | C-1 | C-2 | C-3 | C-4 | C-5 | C-6 | C-7 | C-8 |
|---|---|---|---|---|---|---|---|---|
| Water Solubility[1] | i.O. | i.O. | i.O. | i.O. | i.O. | i.O. | i.O. | i.O. |

[1]After addition of 40 milliMoles HCOOH/100 g resin solids. i.O. = acceptable.

Tests Of The Paints Formulated With The Binders Prepared According To The Invention:

White paints and bath materials for electrode position are prepared using the binders produced according to the Examples C-1 to C-8. Paints coded with "V" are comparison paints where Components (A) and (B) are mixed by stirring for 30 minutes at room temperature.

Paints are prepared on a three-roll mill according to the following formulation:

| | |
|---|---|
| 120 | parts resin (solids) |
| 60 | parts TiO$_2$ |
| 4 | parts lead octoate, 30% |
| 7.5 | parts formic acid, 5-N (30 milliMoles/100 g resins solids) |

The bath is diluted with deionized water to a solids content of 18%. Prior to deposition, the bath material is homogenized at room temperature for twenty-four hours. Deposition is made on zinc-phosphated steel in known manner. The conditions are chosen in order that after stoving for 30 minutes at from 160° to 180° C., a film with a thickness of 18±2 μm is obtained.

Test results of these paints are listed in Table 3 as follows:

TABLE 3

Test Results

| Ex. | Binder Combination Used In Paints | Detergent Test/Cycles | NaOH/5% Hours | Salt Spray Resistance | Erichsen Indentation/mm | Cross Incision | Edge Covering | Gloss 60° % | Yellowing |
|---|---|---|---|---|---|---|---|---|---|
| 1 | C-1 | 23 | 104 | 360 | 8.2 | 1 | i.O. | 70 | i.O. |
| 1 V | C-1 | 8 | 24 | 240 | 8.3 | 1-2 | i.O. | 65 | i.O. |
| 2 | C-2 | 12 | 48 | 120 | 7.0 | 0-1 | i.O. | 75 | i.O. |
| 2 V | C-2 | 0.5 | <1 | 120 | 6.8 | 1 | i.O. | 70 | i.O. |
| 3 | C-3 | 12 | 36 | 500 | 5.2 | 1-2 | i.O. | 75 | i.O. |
| 3 V | C-3 | 8 | 18 | 360 | 5.8 | 1 | i.O. | 60 | i.O. |
| 4 | C-4 | 12 | 60 | 180 | 7.5 | 0-1 | i.O. | 75 | i.O. |
| 4 V | C-4 | 0.5 | <1 | <120 | 7.6 | 0-1 | i.O. | 60 | i.O. |
| 5 | C-5 | 6 | 50 | 240 | 7.0 | 0-1 | i.O. | 70 | i.O. |
| 5 V | C-5 | 1.5 | <1 | <120 | 9.4 | 1-2 | i.O. | 60 | i.O. |
| 6 | C-6 | 5 | 50 | 240 | 6.8 | 0-1 | i.O. | 75 | i.O. |
| 6 V | C-6 | 1.5 | <1 | <120 | 6.7 | 0-1 | i.O. | 70 | i.O. |
| 7 | C-7 | 15 | 60 | 360 | 5.8 | 1 | i.O. | 70 | i.O. |
| 7 V | C-7 | 6 | 24 | 240 | 5.5 | 1 | i.O. | 60 | i.O. |
| 8 | C-8 | 12 | 60 | 240 | 8.9 | 0-1 | i.O. | 75 | i.O. |
| 8 V | C-8 | 1.5 | 12 | 180 | 8.6 | 0-1 | i.O. | 60 | i.O. |

The examples coded with "V" are comparison examples where Components (A) and (B) are used without partial condensation.
i.O. = acceptable.

The tests referred to in Table 3 are made as follows:

Detergent Test:

A 1% solution of a household detergent is heated to 76° C. The coated panel is soaked therein for eight hours. After that time, heating is discontinued and the soaking is continued for a further sixteen hours. This is one cycle. The test is ended when either the film turns soft or shows blistering.

NaOH Test:

The panels are soaked in a 5% NaOH solution at 40° C. until blisters appear.

Other Tests:

The other tests are as follows:
Salt Spray Resistance according to ASTM B-117-64;
Erichsen Indentation according to DIN 53 156;
Cross-Hatch according to DIN 53 151;
Edge Covering, Yellowing is by visual inspection; and
Gloss is measured with Gonioreflectometer GR-COMP (Paar, Austria), measuring angle 60°, % of standard.

As will be apparent to one skilled in the art, various modifications can be made within the scope of the aforesaid description. Such modifications being within the ability of one skilled in the art form a part of the present invention and are embraced by the appended claims.

It is claimed:

1. Process for producing cathodically depositable paint binders based on acrylic copolymers, water-dilutable upon protonation, which crosslink through transesterification or transamidation comprising the steps of reacting at a temperature of from about 100° to 120° C.

Component (A) 60% to 90% by weight of an epoxy group free amine adduct of an acrylic copolymer carrying glycidyl groups and a secondary amine wherein the quantity of said secondary amine is selected in order that the ratio between the original glycidyl groups of said acrylic copolymer and the secondary amino groups of said secondary amine ranges between 1:0.7 and 1:1, and the final product has an amine value of 35 to 140 mg KOH/g and a hydroxyl value of 100 to 250 mg KOH/g, with Component (B) 10% to 40% by weight of an oligomeric or polymeric compound carrying CH-active ester groups capable of transesterification or transamidation to form a partial condensate having an intrinsic viscosity of 8 to 18 ml/g, measured in CHCl$_3$ at 20° C., under the condition such that the ratio between the intrinsic viscosity of the starting mixture and of the condensation product, measured in CHCl$_3$ at 20° C., lies between 1:1 and 1:1.5, and the limit for solubility of the protonated condensation product is not surpassed.

2. The process according to claim 1 wherein Component (A) comprises from about 75% to 85% by weight of the partial condensate, and component (B) comprises from about 15% to 25% by weight of the partial condensate.

3. The process according to claim 1 wherein the acrylic copolymer carries primary hydroxy groups in addition to the glycidyl groups.

4. The process according to claim 1 wherein Component (A) has an amine value of from about 80 to 110 mg KOH/g, and a hydroxyl value of from about 130 to 180 mg KOH/g.

5. The process according to claim 1 wherein the intrinsic viscosity of said partial condensate is from 9 to 15 ml/g, measured in CHCl$_3$ at 20° C.; and the ratio between the intrinsic viscosity of the starting mixture and the condensation product is between 1:1.01 and 1:1.25.

6. The process according to claim 1 wherein Component (B) comprises malonic acid ester groups.

7. The process according to claim 1 wherein the amine of Component (A) is a dialkanolamine or primary and secondary amino group containing polyamines, the primary amino groups thereof being blocked as ketimines.

8. The process according to claim 1 wherein in binder Component (A) the acrylate copolymer is obtained through reaction of glycidyl(meth)acrylate with amines with subsequent copolymerization.

9. The process according to claim 1 wherein binder Component (B) is a partial polytransesterification product of a KNOEVENAGEL-reaction product of diethylmalonate and formaldehyde.

10. The process according to claim 9 wherein binder Component (B) is a reaction product of diethylmalonate and formaldehyde condensed with 30 to 40 mole-% of propylene-lycol-1,3.

11. A cathodically depositable paint comprising a binder made by the process of any one of claims 1–10.

12. Cathodically depositable paint binders based on acrylic copolymers, water-dilutable upon protonation, which crosslink through transesterification or transamidation comprising the reaction product of Component (A) with Component (B), said Component (A) being 60% to 90% by weight of an epoxy group free amine adduct of an acrylic copolymer carrying glycidyl groups and a secondary amine wherein the quantity of said secondary amine is selected in order that the ratio between the original glycidyl groups of said acrylic copolymer and the secondary amino groups of said secondary amine ranges between 1:0.7 and 1:1, and the final product has an amine' value of 35 to 140 mg KOH/g and a hydroxyl value of 100 to 250 mg KOH/g, and said Component (B) being 10% to 40% by weight of an oligomeric or polymeric compound carrying CH-active ester groups capable of transesterification or transamidation, the reaction of Components (A) and (B) being carried out to form a partial condensate having an intrinsic viscosity of 8 to 18 ml/g, measured in CHCl$_3$ at 20° C., and under condition such that the ratio between the intrinsic viscosity of the starting mixture of Components (A) and (B) and of the final condensation product, measured in CHCl$_3$ at 20° C., lies between 1:1 and 1:1.5, and the limit for solubility of the protonated condensation product is not surpassed.

13. The binder of claim 12 wherein Component (A) comprises from about 75% to 85% by weight of the partial condensate, and component (B) comprises from about 15% to 25% by weight of the partial condensate.

14. The binder of claim 12 wherein the acrylic copolymer carries primary hydroxy groups in addition to the glycidyl groups.

15. The binder of claim 12 wherein Component (A) has an amine value of from about 80 to 110 mg KOH/g, and a hydroxyl value of from about 130 to 180 mg KOH/g.

16. The binder of claim 12 wherein the intrinsic viscosity of said partial condensate is from 9 to 15 ml/g, measured in CHCl$_3$ at 20° C; and the ratio between the intrinsic viscosity of the starting mixture and the condensation product is between 1:1.01 and 1:1.25.

17. The binder of claim 12 wherein Component (B) comprises malonic acid ester groups.

18. The binder of claim 12 wherein the amine of Component (A) is a dialkanolamine or primary and secondary amino group containing polyamines, the primary amino groups thereof being blocked as ketimines.

19. The binder of claim 12 wherein in binder Component (A) the acrylate copolymer is obtained through reaction of glycidyl(meth)acrylate with amines with subsequent copolymerization.

20. The binder of claim 12 wherein binder Component (B) is a partial polytransesterification product of a KNOEVENAGEL-reaction product of diethylmalonate and formaldehyde.

21. The binder of claim 20 wherein binder Component (B) is a reaction product of diethylmalonate and formaldehyde condensed with 30 to 40 mole-% of propyleneglycol-1,3.

22. A cathodically depositable paint for decorative single-coat paints or pale primers comprising a binder of any one of claims 12–21.

* * * * *